Nov. 7, 1933.  O. N. GREDELL  1,933,730
DUST COLLECTOR
Filed Nov. 25, 1931
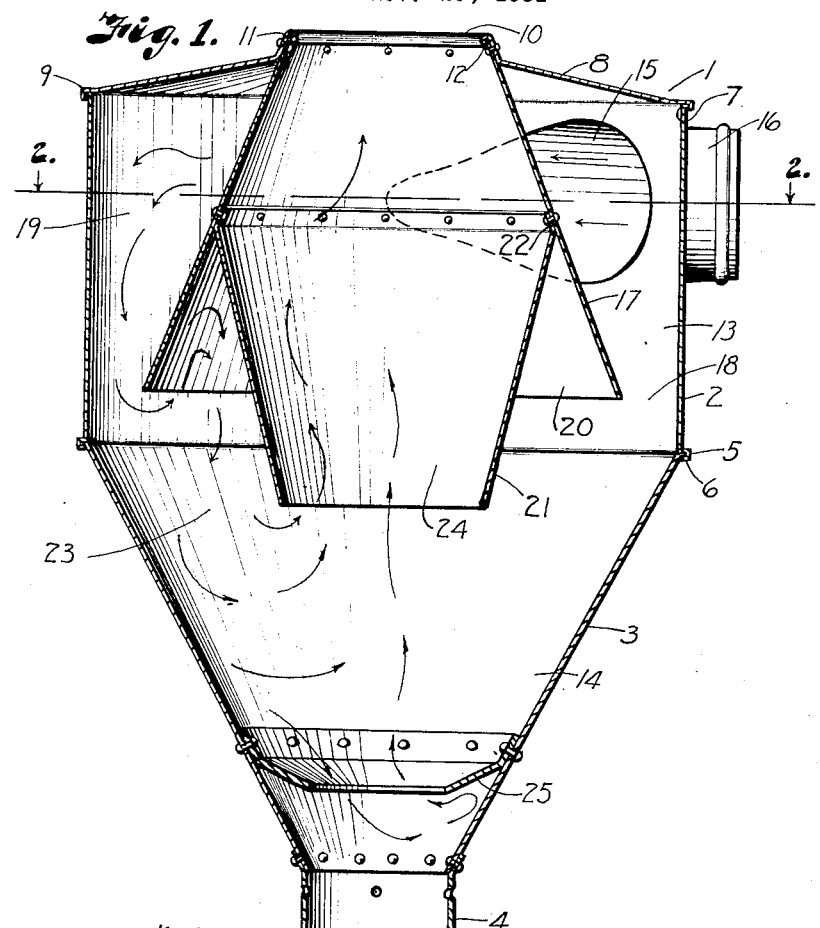
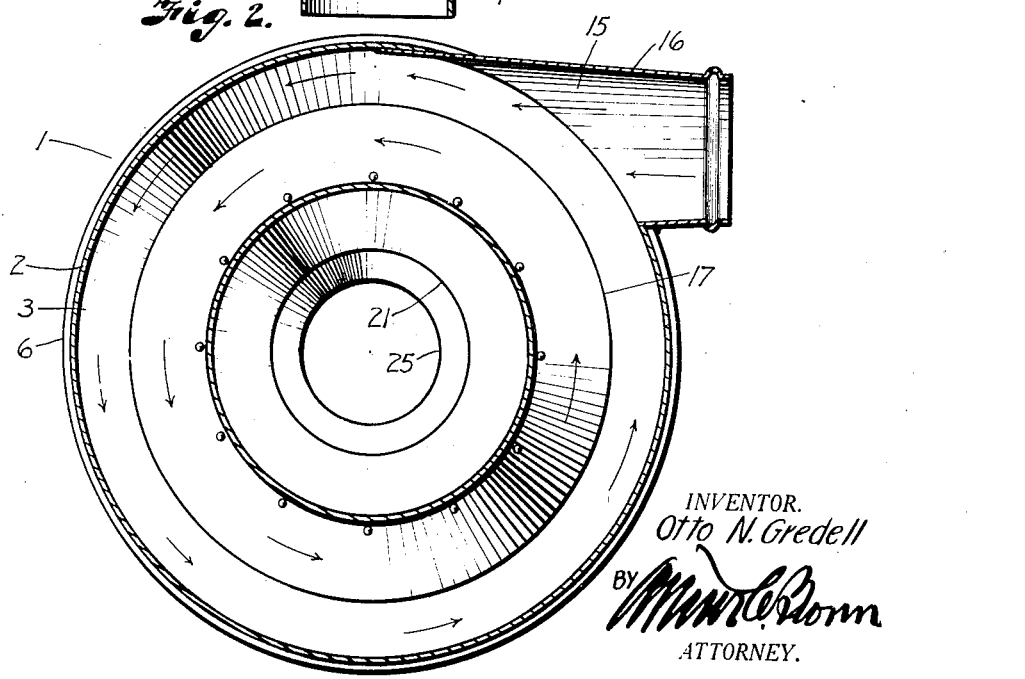
INVENTOR.
Otto N. Gredell
BY
ATTORNEY.

Patented Nov. 7, 1933

1,933,730

UNITED STATES PATENT OFFICE 1,933,730

DUST COLLECTOR

Otto N. Gredell, Kansas City, Mo., assignor to Standard Steel Works, North Kansas City, Mo., a corporation of Missouri Application November 25, 1931
Serial No. 577,173

2 Claims. (Cl. 183—89)

This invention relates to dust collectors, and particularly to those of the centrifugal type, and has for its principal object to provide a dust collector of this character having a higher degree of efficiency in order that the air discharged therefrom is substantially free from dust particles.

It is also an important object of the invention to provide a more compact construction which is lighter in weight and requires less space than present collectors of the same capacity.

In accomplishing these and other objects of the invention, I have provided improved details of structure, the preferred form of which is illustrated in the accompanying drawing, wherein:

Fig. 1 is a verical central sectional view through a collector constructed in accordance with my invention; and Fig. 2 is a horizontal sectional view through the collector on the line 2—2, Fig. 1.

Referring in detail to the drawing:

1 designates the collector housing which is preferably constructed of sheet metal and consists of an upper cylindrical band 2 and a lower funnel-shaped member 3 having its upper end substantially equal to the diameter of the band 2 and its lower end terminating in a reduced diameter to connect with a dust outlet collar 4 that may be connected to an off-take pipe (not shown).

The upper edge of the funnel-shaped member is flanged outwardly as at 5 to engage in a rolled rim 6 on the lower end of the band to secure the parts together.

The upper end of the band 2 is flanged outwardly as at 7, and is closed by an upwardly dished cap plate 8 having a rolled peripheral edge 9 engaging the flange 7. Formed centrally of the cap plate in axial alignment with the dust outlet 4 is an air outlet opening 10 having an upwardly inclined collar provided with an inturned flange 11 forming a finished edge for the opening and a downwardly opening grooved seat 12 for a purpose later described.

The housing thus forms an upper cylindrical separating chamber 13 and a lower downwardly contracting dust collecting chamber 14.

Formed in the chamber 13 adjacent its upper end is an inlet opening 15 having a neck 16 arranged tangentially of the wall of the chamber for admitting the dust-laden air into the collector, the neck being connected with the source of the dust-laden air.

The separating chamber 13 is divided into a plurality of expansion chambers having restricted outlets wherein the air is allowed to expand and contract in a series of steps to gradually reduce its velocity and cause separation of the dust particles as now described.

Seated in the groove 12 formed by the flange 11 is a truncated conical deflector 17 having its lower end flaring outwardly toward the side wall of the separation chamber but terminating short thereof to provide an annular passageway 18 therebetween. The deflector member thus forms, with the inner wall of the housing, an annular whirl chamber 19 having larger capacity adjacent the air inlet to allow expansion of the air and centrifugal separation of the dust, and having gradually reducing capacity towards the outlet passage to retard the flow of air and reduce its dust carrying velocity so that it will not tend to again pick up the dust that has been separated by the whirling action of the air in the upper portion of the whirl chamber.

The dust separated is thus free to settle downwardly of the inner wall of the housing and be guided by the funnel-shaped portion thereof into the dust outlet 4.

As soon as the air passes under the deflector member it again expands into a second annular eddy chamber 20 wherein the air again loses its velocity and begins to change its direction of travel towards the center of the housing.

This last mentioned chamber is formed by a downwardly converging cone-shaped baffle 21 positioned within the deflector and having its larger upper end flanged inwardly as at 22 to conform to the slope of the baffle, the baffle being secured by rivets or the like at a point substantially midway of the length of the deflector to form a joint therewith and close the upper end of the second expansion or eddy chamber. The lower wall of the inner baffle converges downwardly toward the axis of the housing but terminates short of the sloping wall thereof to form an annular outlet 23 for the expanded air in the chamber 20. The outlet passage is also of a size to effect slight choking of the flow of air before changing its direction of travel.

The air then travels upwardly through the lower open end of the baffle 21 and again expands in a third chamber 24 formed by the respective baffles. The third chamber has an enlarged intermediate portion due to the opposed position of the baffles so that the air gradually expands during its egress therethrough and then contracts before it escapes through the air outlet opening at the upper end of the collector. The dust and other particles carried by the air in its passage through the respective expansion chambers gravitate to the outlet 4.

In order to prevent the swirling air stream from passing through the outlet 4, an inwardly extending annular flange 25 is attached to the wall of the member 3 at a point above the outlet to form a deflector for diverting the air stream in a path across to the opposite side of the housing at a point below the flange, whereby that portion of the flange serves as a deflector to prevent the air from picking up the dust after it has passed the flange. The air passing upwardly through the baffle 24 creates sufficient upward draft at the axis of the collector to cause the deflected air below the flange to return to the chamber 14, as shown by the arrows in Fig. 1.

What I claim and desire to secure by Letters Patent is:

1. A dust collector comprising a cylindrical housing having an axial air outlet opening at its upper end and having a cone-shaped lower end provided with a dust outlet opening, a truncated cone-shaped deflector member suspended within the housing and cooperating therewith to form an annular whirl chamber having gradually decreasing capacity toward the lower edge of the deflector, an inlet connector arranged to discharge dust-laden air circumferentially of said annular chamber, and an inverted truncated cone-shaped member positioned axially within the deflector member and having its larger end fixed to the periphery of said deflector member midway its length to form an annular eddy chamber communicating with the whirl chamber and a central expansion chamber communicating with said eddy chamber having gradually increasing capacity from its inlet end and decreasing capacity toward the air outlet of said housing.

2. A dust collector comprising a cylindrical housing having a central outlet opening at its top and having a cone shaped lower end provided with a dust outlet opening, a truncated cone shaped deflector member supported within the housing with its smaller end sealingly engaging the outlet opening and cooperating with the housing to form an annular whirl chamber having gradually decreasing capacity toward the lower edge of the deflector, an inlet connector arranged to discharge dust laden air circumferentially of said annular chamber, an inverted truncated cone shaped member positioned axially within said deflector member and having its larger end fixed to the deflector member substantially midway of its length to form an annular eddy chamber communicating with the whirl chamber and a central expansion chamber communicating with the eddy chamber and having gradually increasing capacity from its inlet end and decreasing capacity toward the air outlet in the housing, and a second inverted truncated cone shaped member having its larger end sealingly engaging the cone shaped end of the housing and having an outlet in its lower end of smaller diameter than the lower end of the first named inverted member to cooperate therewith in controlling flow of air from said eddy chamber.

OTTO N. GREDELL.